United States Patent
Leisenheimer et al.

(10) Patent No.: US 11,709,728 B2
(45) Date of Patent: Jul. 25, 2023

(54) DEVICE, CONTROLLER FOR A DEVICE AND METHOD OF COMMUNICATING

(71) Applicant: Infineon Technologies AG, Neubiberg (DE)

(72) Inventors: Stephan Leisenheimer, Deisenhofen (DE); Catalina-Petruta Juglan, Botosani (RO)

(73) Assignee: Infineon Technologies AG, Neubiberg (DE)

( * ) Notice: Subject to any disclaimer, the term of this patent is extended or adjusted under 35 U.S.C. 154(b) by 159 days.

(21) Appl. No.: 17/188,075

(22) Filed: Mar. 1, 2021

(65) Prior Publication Data
US 2021/0279125 A1    Sep. 9, 2021

(30) Foreign Application Priority Data

Mar. 4, 2020  (DE) ......................... 102020105794.6

(51) Int. Cl.
*G06F 11/10*    (2006.01)
*G06F 13/42*    (2006.01)

(52) U.S. Cl.
CPC .......... *G06F 11/10* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 5,917,840 A | 6/1999 | Cheney et al. | |
| 2010/0315965 A1* | 12/2010 | Nemeth | H04L 1/0047 370/252 |
| 2018/0337809 A1 | 11/2018 | Kishiyama et al. | |
| 2019/0095275 A1 | 3/2019 | Dusija et al. | |

FOREIGN PATENT DOCUMENTS

| | | | | |
|---|---|---|---|---|
| CN | 104880575 A | | 9/2015 | |
| CN | 111130689 A | * | 5/2020 | ........... H04L 1/0041 |
| CN | 113711653 A | * | 11/2021 | ........... G05B 19/042 |
| EP | 2648358 A2 | | 10/2013 | |

* cited by examiner

*Primary Examiner* — Guerrier Merant
(74) *Attorney, Agent, or Firm* — Harrity & Harrity, LLP

(57) ABSTRACT

A device includes an interface configured to connect to a communication link. A controller of the device is configured to generate a redundancy code using first data and second data, and to transmit the redundancy code together with the first data to the interface.

21 Claims, 2 Drawing Sheets

DEVICE, CONTROLLER FOR A DEVICE AND METHOD OF COMMUNICATING

RELATED APPLICATION

This application claims priority to German Patent Application No. 102020105794.6, filed on Mar. 4, 2020, which is incorporated herein by reference in its entirety.

FIELD

Examples relate to devices, controllers, and methods of communicating between devices and controllers.

BACKGROUND

Data transfer or communication between two devices may be protected with a checksum or a redundancy code. While security, e.g., the capability to conclude on a transmission error using the redundancy code, is one important aspect of communicating, speed is another. The faster the data transfer is, the better the performance of a communication system.

In order to increase the speed of data transmission while maintaining security, a common approach is to increase the transmission frequency. However, increasing transmission frequency comes along with electromagnetic compatibility (EMC) challenges, for example if data transfer is performed via long wired interconnects. For example, sensors are often placed apart from the electronics evaluating the sensor data which may cause long wired interconnects between the sensor and its controller. In such and similar settings, increasing clock frequency may not be an option.

Hence, there is a demand to increase the speed of data transmission by alternative means.

SUMMARY

According to an embodiment, a device includes an interface configured to connect to a communication link. The device further includes a controller configured to generate a redundancy code using first data and second data and to transmit the redundancy code together with the first data to the interface. While the controller generates the redundancy code for both, the first data and the second data, the second data may not be transmitted via the interface. This may save the bandwidth consumed by the second data as compared to an approach where both, the first data and the second data is transmitted together with the redundancy code and, hence, result in an effective increase of transmission speed without changing the physical parameters of the communication link.

An embodiment of a controller for a device includes an interface configured to connect to a communication link and to receive a redundancy code together with first data via the communication link. The controller further includes a circuit configured to generate second data based on an expected state of the device, to compute an expected redundancy code using the first data and the second data, and to determine an unexpected state of the device if the redundancy code and the expected redundancy code are different. The controller can so conclude on the state of the device although the second data, which may be foreseen to contain control data having information on the state of the device does not need to be transmitted.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated.

This detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Figure 1:
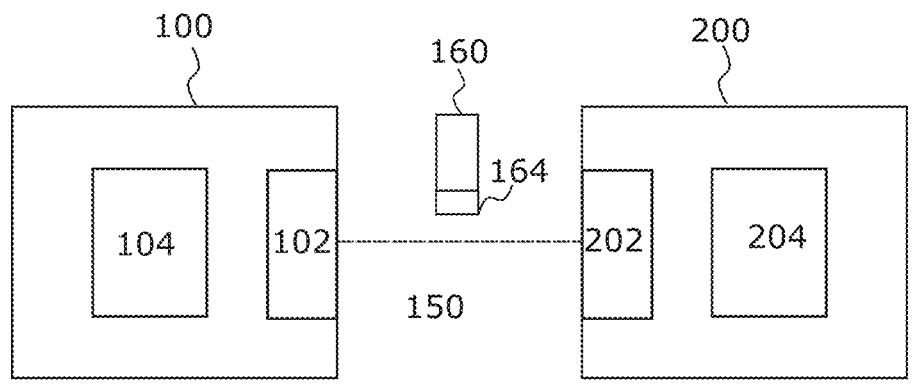
FIG. 1 illustrates an example of a device and of a controller for the device communicating with each other.
Figure 2:
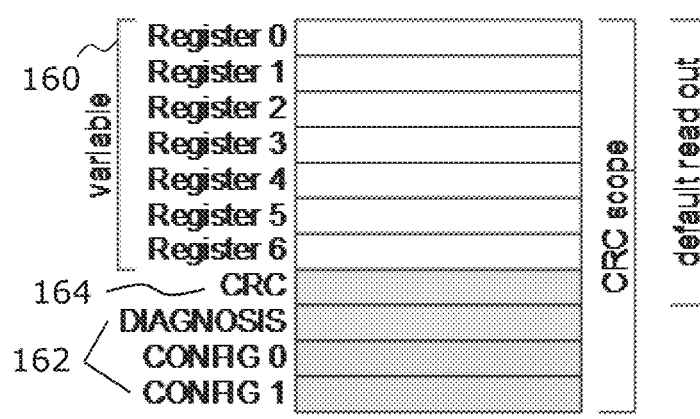
FIG. 2 illustrates an example of data that may be used in the communication between the devices illustrated in FIG. 1.

FIG. 1 schematically illustrates an example of a device 100 and an example of a controller 200 for the device which can communicate with each other if they are connected by a communication link 150. FIG. 2 illustrates one particular example for first data 160, second data 162 and a redundancy code (red. code) 164, which may be generated by the device 100 and which may be partly transmitted to the controller 200 in a communication between the device 100 and the controller 200.

The device comprises an interface 102 configured to connect to the communication link 150. Similarly, the controller 200 comprises an interface 202 configured to connect to the communication link 150. The device further comprises a controller 104 configured to generate the redundancy code 164 using first the data 160 and the second data 162 and to transmit the redundancy code 164 together with the first data 160 to the interface 102. While the controller generates the redundancy code 164 for both, the first data 160 and the second data 162, the second data is not transmitted via the interface 102 afterwards. This may save the bandwidth consumed by the second data 162 as compared to an approach where, the first data 160 and the second data 162 is transmitted together with the redundancy code 164.

A redundancy code 164 is data which is computed according to a predetermined algorithm based on payload data to be transmitted. The redundancy code 164 allows to conclude, whether the payload data has been corrupted during transmission. To do so within the controller, the received redundancy code is compared with an expected redundancy code computed using the same predetermined algorithm on the received payload data. If the received redundancy code and the computed redundancy code are identical, one can conclude that the data has not been altered during transmission. If the two redundancy codes are not equal, one can conclude that the data received is not valid and try to generate uncorrupted data, for example by requesting retransmission. As compared to an error correction code, a redundancy code may not allow to correct an error within the received data. However, the redundancy code consumes less bandwidth than an error correction code. Nonetheless, further embodiments may also be based on the transmission of an error correction code.

Even though the controller 200 does not receive the second data 162, it is capable to generate second data based on an expected state of the device, the generated second data serving as a substitute for the second date generated within the device 100. In other words, some implementations may allow to anticipate the content of the second data by the controller 200 so that, even though the second data 162 is not transmitted, the controller 200 can compute an expected redundancy code based on the received first data 160 and the anticipated second data. If the so generated expected redundancy code is equal to the received redundancy code, the controller 200 may, likewise, conclude, that the data received from device 100 is not corrupt and that the anticipated second data corresponds to the second data generated within device 100.

Applications, where a controller 200 can anticipate the second data 162 are numerous. For example, some implementations may always submit control data as the second data 162 together with variable payload data contained in the first data 160. For example, a state or configuration of the device may be signaled within the second data 162, which is expected to remain constant once the device 100 was configured. Therefore, a single transmission of the second data 162 can be sufficient to enable the controller 200 to anticipate the content of the second data in further transmissions. Other protocols may, for example, use an increasing counter to uniquely identify subsequent data transmissions, so that the controller can anticipate the second data 162 by running an independent incrementing counter to anticipate the content of the second data 162.

A further example are applications where the device 100 communicates using a protocol where variable payload data is transmitted within the first data 160, while configuration data and/or diagnosis data comprising information about a functional state of the device is transmitted by means of the second data 162. If it is diagnosis data that is included in the second data 162, the controller 200 may, for example, anticipate that the diagnosis data corresponding to a fully functional device 100 is submitted as the second data 162 to compute the expected redundancy code. In such a scenario, if the expected redundancy code does not match the received redundancy code, the controller 200 can conclude that either the data submitted as the first data 160 has been corrupted during transmission or that the device is in an unexpected state. The unexpected state is characterized as a state making the device 100 submit diagnosis data that deviates from the diagnoses submitted if the device works properly. Since the controller 200 anticipates the diagnosis data for a properly working device, the received redundancy code and the computed expected redundancy code will differ and, hence, the controller 200 would be aware that either the first data 160 or the device 100 are corrupt although the second data 162 indicating the functional state of the device is not even transmitted. At the same time, the transmission bandwidth that would be consumed for the second data 162 is saved.

The previous considerations apply, for example, if the device 100 is configured to include variable payload data into the first data 160 and to include control data into the second data 162. The control data may comprise at least an information about a functional state of the device.

In further embodiments, the control data may alternatively or additionally comprise at least an information about a configuration of the device, the configuration of the device being anticipate about by the controller 200. This may particularly be the case if the controller 200 sets the configuration of the device 100 itself, e.g. during startup of the system. The latter may, for example, be the case in applications where the device 100 corresponds to a sensor which is controlled by the controller 200 and which is configured/set up by means of the controller 200. For example, the controller 200 may signal a particular configuration to be used by the device 100 or the sensor upon startup of the device 100 so that the controller knows upfront, which configuration the device 100 is to transmit by means of the second data 162 if the device works as expected.

While the configuration for the device 100 may be externally set and while the diagnosis information may be read from a register or may be computed within the device 100, further embodiments of the device 100 may further comprise an additional circuit to generate variable first data 160. For variable data, subsequent transmissions of first data 160 comprise different content if the device is working properly. As opposed to the second data 162, there is no means to anticipate the variable data.

One particular application is the use of the described embodiments within a sensor for sensing a physical quantity, the sensor being controlled by means of an external controller 200. Sensors of that kind are often used in automotive or other industrial applications and the variable data describing the sensed physical quantity is communicated by means of the first data 160.

To operate as a sensor, the device 100 comprises at least one sensor element to sense a physical quantity, and the controller 104 is configured to include a digital representation of the physical quantity into the first data 160. For example, sensors configured to determine a magnetic field strength, the presence of a magnetic field above a certain threshold, temperature, pressure, light intensities or the like may be used.

Further embodiments may be implemented within a memory so that a circuit within the device 100 comprises at least one memory element and the controller 104 is configured to include a digital representation of an information stored in the memory element into the first data 160. Using an embodiment as described before with a memory, a transmission bandwidth when accessing the memory can be increased to the extent the second data 162 would normally be transmitted. The increase of transmission speed can be significant.

If, for example, assuming that a protocol uses seven bits for variable data, one bit for the redundancy code, and three bits for diagnosis and/or configuration data, use of the previously described embodiments may increase transmission bandwidth by approximately 30% (3/11).

The previously described embodiments may even be used within already existent applications, provided one can modify the settings of the device 100 and/or of the controller 200 such that the submission of the second data 162 can be deliberately disabled, although required in the original design. In some protocols, as for example in the Inter-Integrated Circuit (I2C) protocol, the controller 200 controls the amount of data read from the device 100 by the number of clock cycles generated on a single wire bus. For each clock cycle, the device 100 transmits a single bit or the bit of a single register is read out. That is, the controller 200 can by itself control the amount of data transmitted by adjusting the number of clock cycles. The transmission of single bits is just an example. Often, the transmitted data is split in bytes or words. After each new byte/word is received, the controller 200 can decide to send further 8/16 clock cycles to read another byte/word. In such applications, data communication following the principles described herein can even be applied in existing setups by updating the controller's firmware or software to increase the data transmission speed without losing the capability to determine, whether the components of the system work reliably or not.

When using the embodiments described previously on an I2C Bus, the interface 102 is configured to connect to a communication link 150 compliant with I2C. Further embodiments may also use different bus systems. For example, the interfaces of the device 100 and the controller 200 may be likewise configured to connect to a Serial Peripheral Interface (SPI) or to a Synchronous Serial Communication (SSC).

In summary and as already explained in detail, the circuit 204 of the controller 200 is configured to generate second data based on an expected state of the device, to compute an expected redundancy code using the first data and the second data, and to determine an unexpected state of the device 100 if the redundancy code 164 and the expected redundancy code are different. The controller 200 may be made aware of the expected state of the device 100 by various different means. For example, the controller 200 itself may be used to set a configuration of the device 100. Likewise, the controller 200 may receive the expected state of the device 100 by a third entity or, for example, from the device 100 itself during startup of the system.

Once the controller 200 is aware that the device 100 may be in an unexpected state, the controller 200 may implement various measures to conclude on the type of error or to bring a system into a safe operation mode. According to some embodiments, for example, the controller 200 may cause a full transmission of the first data 160, the second data 162, and the redundancy code 164 in a subsequent communication cycle to distinguish, whether it is the second data one 162 that caused the expected redundancy code to deviate from the received redundancy code 164 or whether it is a transmission error corrupting the first data 160 or the redundancy code 164. That is, the interface 202 of the controller 200 may receive a further redundancy code together with further first data and with further second data via the communication link if an unexpected state is determined. If the full transmission of the first data 160, the second data 162, and the redundancy code 164 contains second data 162 that deviates from the expected configuration and/or state of the device 100, the controller 200 of the device 100 may take appropriate measures, such as for example ignore the first data 160 delivered by the device 100 or to reset or reconfigure the device 100 so as to bring it back into an expected state in which the first data 160 provided by the device can be reliably used.

To make the device 100 submit the full set of data, the controller 200 may, for example, transmit a request via the interface 202, the request causing the device to generate the further redundancy code using the further first data and the further second data and to transmit the further redundancy code, the further first data, and the further second data via the communication link.

As already elaborated on before, upon determination that the device 100 is in an unexpected state, the circuit 204 may further be configured to switch the controller 200 from a first operation mode used for a device 100 in the expected state to a second operation mode used for a device 100 in the unexpected state. The first and second operation modes may distinguish, for example, in that the data from the device 100 is disregarded or that the data received from the device 100 is replaced by predetermined data in the second operation mode.

FIG. 2 illustrates a particular example of a protocol used to read out variable data delivered from a sensor via single wire protocol (I2C). In the illustrated example, the first data 160 comprises seven bits (or, alternatively, words or bytes) of variable data read out from seven registers of the sensor. A single bit (or word) of a redundancy code 164 is computed using the first data 160 and second data 162, which consists of three bits (words) of control data. While the redundancy code 164 is computed for the first data 160 and for the second data 162, the second data 162 is not transmitted, saving the three bits which would be otherwise consumed by the second data 162. In the present setup, the transmission speed is increased by 3/11 when embodiments as previously described are used, while the capability to determine errors in the transmission or in the device remains unchanged.

Apart from increasing the transmission speed, the safety integration time (or the fault tolerance time) can also be improved when communication is performed according to the embodiments described herein. The safety integration time is the time between the occurrence of a failure until the failure gets out of control. Since the second data 162 is not transmitted, the full transmission of the first data 160 and of the redundancy code 164 (the latter enabling the controller 200 to conclude on the presence of a failure or an error) is finished nearly 30% faster than the full transmission. That is, a system capable to determine an error gains 30% of transmission time to perform countermeasures in order to avoid that an error brings a system operating based on the first data 160 of the device 100 out of control.

As a summary, FIGS. 3 and 4 subsequently illustrate flowcharts of methods for communicating, as they may be performed in the device 100 or in the controller 200. Since the details of communication and, hence, the steps of the methods of communicating, have already been described in detail with respect to FIGS. 1 and 2, a redundant description of the individual steps of the method will, for the sake of conciseness, not be repeated.

Figure 3:
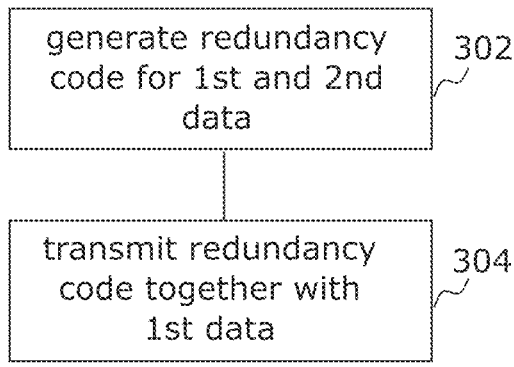
FIG. 3 illustrates a flowchart of an example of a method for communicating.

FIG. 3 illustrates a flowchart of an example of a method for communicating, as it may be performed with in the device 100. The method comprises generating a redundancy code 302 using first data and second data and transmitting 304 the redundancy code together with the first data.

Some embodiments of the method may further comprise including variable payload data into the first data and including control data into the second data.

Figure 4:
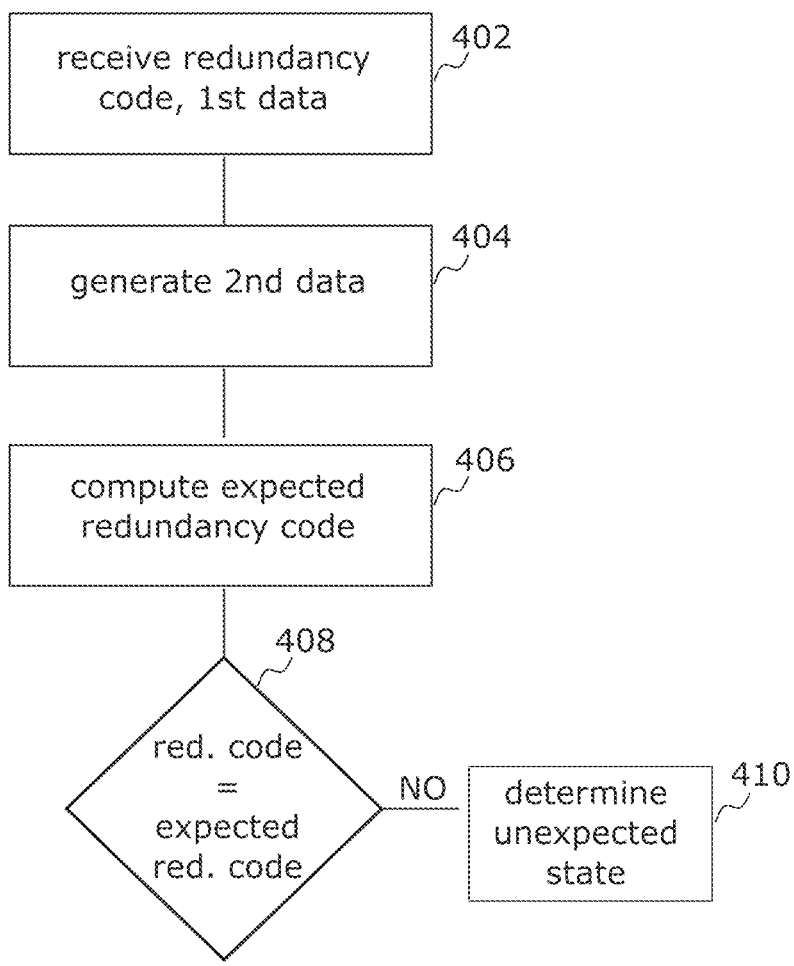
FIG. 4 illustrates a flowchart of a further example of a method for communicating.

FIG. 4 illustrates a flowchart of an example of another method for communicating, as it may, for example, be performed within a controller 200.

The method comprises receiving a redundancy code together with first data 402 via a communication link and generating second data 404 based on an expected state of a device.

The method further comprises computing an expected redundancy code 406 using the first data and the second data. Further, the method comprises determining an unexpected state of the device 410 if the redundancy code and the expected redundancy code are different.

To this end, the method may further optionally comprise comparing 408 the redundancy code with the expected redundancy code.

The aspects and features mentioned and described together with one or more of the previously detailed examples and figures may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram within the description may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A device, comprising:
an interface configured to connect to a communication link;
a controller configured to:
generate a redundancy code using first data and second data; and
transmit the redundancy code together with the first data to the interface,
wherein the second data is data anticipated by a recipient and wherein the second data is omitted from transmission.

2. The device of claim 1, wherein the controller is configured to:
include variable payload data within the first data; and
include control data within the second data.

3. The device of claim 2, wherein the control data comprises at least information about a functional state of the device.

4. The device of claim 2, wherein the control data comprises at least information about a configuration of the device.

5. The device of claim 1, further comprising:
a circuit configured to generate the first data.

6. The device of claim 5, wherein the circuit comprises at least one sensor element to sense a physical quantity, and wherein the controller is configured to include a digital representation of the physical quantity into the first data.

7. The device of claim 5, wherein the circuit comprises at least one memory element, and wherein the controller is configured to include a digital representation of information stored in the memory element into the first data.

8. The device of claim 1, wherein the interface is configured to connect to a communication link compliant with one of an Inter-Integrated Circuit (I2C), a Serial Peripheral Interface (SPI), or a Synchronous Serial Communication (SSC).

9. A controller for a device, comprising:
an interface configured to connect to a communication link and to receive a redundancy code together with first data via the communication link;
a circuit configured to:

generate second data based on an expected state of the device;

compute an expected redundancy code using the first data and the second data; and detect an unexpected state of the device if the redundancy code and the expected redundancy code are different.

10. The controller of claim 9, wherein the interface is further configured to receive a further redundancy code together with further first data and with further second data via the communication link if an unexpected state is detected.

11. The controller of claim 10, wherein the circuit is further configured to:

transmit a request via the interface, the request causing the device to generate the further redundancy code using the further first data and the further second data and to transmit the further redundancy code, the further first data, and the further second data via the communication link.

12. The controller of claim 9, wherein the circuit is further configured to switch the controller from a first operation mode used for a device in the expected state to a second operation mode used for a device in the unexpected state in response to detecting the unexpected state.

13. The controller of claim 9, wherein the circuit is further configured to transmit a reset request via the interface if the unexpected state of the device is detected, the reset request causing the device to reset or to use a specific device configuration.

14. The controller of claim 9, wherein the interface is configured to connect to a communication link compliant with one of an Inter-Integrated Circuit (I2C), a Serial Peripheral Interface (SPI), or a Synchronous Serial Communication (SSC).

15. A method of communicating, comprising:

generating a redundancy code using first data and second data; and transmitting the redundancy code together with the first data, wherein the second data is data anticipated by a recipient and wherein the second data is omitted from transmission.

16. The method of claim 15, further comprising:

including variable payload data within the first data; and including control data within the second data.

17. The method of claim 16, wherein the control data includes at least information about a functional state of a device.

18. The method of claim 16, wherein the control data comprises at least information about a configuration of a device.

19. A method of communicating, comprising:

receiving a redundancy code together with first data via a communication link;

generating second data based on an expected state of a device;

computing an expected redundancy code using the first data and the second data; and detecting an unexpected state of the device if the redundancy code and the expected redundancy code are different.

20. The method of claim 19, further comprising:

receiving a further redundancy code together with further first data and with further second data via a communication interface if an unexpected state is detected.

21. A non-transitory computer-readable medium comprising a computer program having a program code configured to cause a programmable hardware device to execute a method of communicating, the method of communicating comprising:

receiving a redundancy code together with first data via a communication link;

generating second data based on an expected state of a device;

computing an expected redundancy code using the first data and the second data; and detecting an unexpected state of the device if the redundancy code and the expected redundancy code are different.

* * * * *